(12) United States Patent
Harland et al.

(10) Patent No.: US 10,067,894 B1
(45) Date of Patent: Sep. 4, 2018

(54) CABLE-BASED CONFIGURATION

(71) Applicant: Amazon Technologies, Inc., Seattle, WA (US)

(72) Inventors: Jason Alexander Harland, Seattle, WA (US); Ziv Harel, Kibbutz Megiddo (IL); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 14/830,423

(22) Filed: Aug. 19, 2015

(51) Int. Cl.
 G06F 13/20 (2006.01)
 G06F 13/28 (2006.01)
 G06F 13/10 (2006.01)
 G06F 13/40 (2006.01)

(52) U.S. Cl.
 CPC ............ G06F 13/28 (2013.01); G06F 13/102 (2013.01)

(58) Field of Classification Search
 CPC ................................. G06F 13/20; G06F 13/40
 USPC ............................................................ 710/8
 See application file for complete search history.

(56) References Cited

U.S. PATENT DOCUMENTS

| | | | | |
|---|---|---|---|---|
| 8,351,747 B1 * | 1/2013 | Aybay | ................. | G02B 6/3895 385/100 |
| 9,215,491 B1 * | 12/2015 | Yeh | ..................... | G06F 13/4068 |
| 2009/0138935 A1 * | 5/2009 | Ohkita | ................... | G09G 5/006 725/134 |
| 2010/0132004 A1 * | 5/2010 | Ota | ........................ | G06F 13/387 725/127 |
| 2011/0283129 A1 * | 11/2011 | Guillerm | ................ | G09G 5/006 713/324 |
| 2013/0250180 A1 * | 9/2013 | Wang | ....................... | H04N 5/44 348/720 |
| 2014/0205024 A1 * | 7/2014 | Toba | ................. | H04N 21/43635 375/240.28 |
| 2015/0067195 A1 * | 3/2015 | Sharma | .................. | H04N 5/765 710/14 |
| 2015/0286587 A1 * | 10/2015 | Ranade | ............... | G06F 11/3027 710/16 |
| 2015/0358675 A1 * | 12/2015 | Xu | ......................... | H04N 5/765 348/706 |
| 2016/0140075 A1 * | 5/2016 | Kashyap | ............. | G06F 13/4265 710/104 |
| 2016/0142647 A1 * | 5/2016 | Gopinath | ............... | H04N 5/765 348/706 |
| 2017/0060804 A1 * | 3/2017 | Chiba | ................. | G06F 13/4081 |
| 2017/0195726 A1 * | 7/2017 | Aggarwal | ........ | H04N 21/44227 |

* cited by examiner

*Primary Examiner* — Christopher Shin
(74) *Attorney, Agent, or Firm* — Klarquist Sparkman, LLP

(57) ABSTRACT

The following description is directed to cable-based configuration. In one example, a method can include determining a first end of a cable is connected to a first device and a second end of the cable is connected to a second device. The first device can be configured to perform a first function when it is determined the first end of the cable is connected to the first device. The second device can be configured to perform a second function when it is determined the second end of the cable is connected to the second device. The second function can be different from the first function, such that the first device and the second device are configured differently based on which end of the cable is connected to the respective device.

20 Claims, 9 Drawing Sheets

US 10,067,894 B1

CABLE-BASED CONFIGURATION

BACKGROUND

Cloud computing is the use of computing resources (hardware and software) which are available in a remote location and accessible over a network, such as the Internet. In some arrangements, users are able to buy these computing resources (including storage and computing power) as a utility on demand. Cloud computing entrusts remote services with a user's data, software and computation. Use of virtual computing resources can provide a number of advantages including cost advantages and/or the ability to adapt rapidly to changing computing resource needs.

Large computer systems, including cloud computing facilities can include many compute resources spread across one or more datacenters. In aggregate, the computer systems can include many different types of components that perform different functions. For example, different components can be used to provide redundancy, load balancing, and/or specialized computing functions. It can be costly to maintain an inventory of a large number of different types of components for the computing facility. Thus, the cloud service provider may desire to reduce the number of distinct components used within the computing facility.

DETAILED DESCRIPTION

Figure 1:
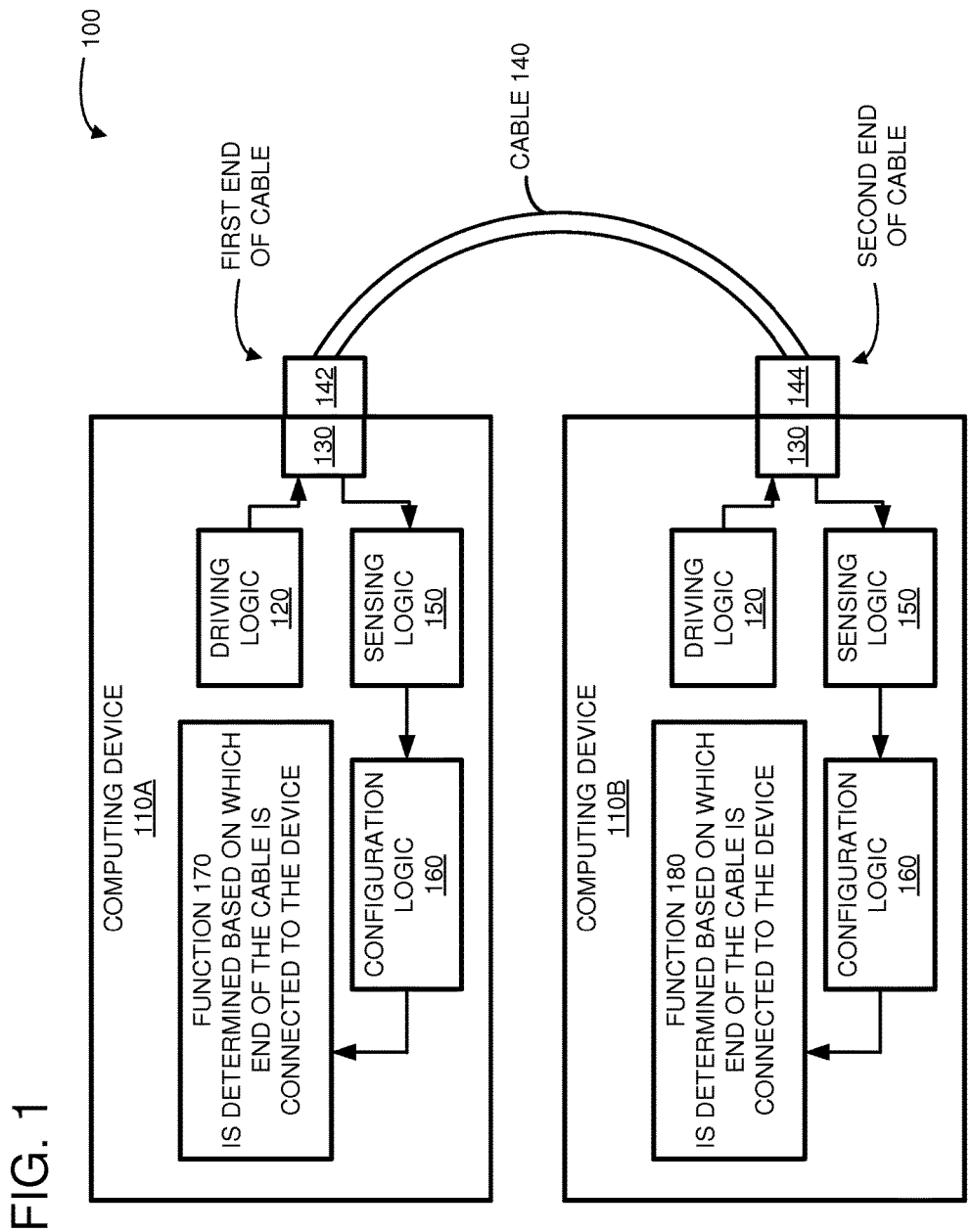
FIG. 1 is a system diagram showing an example computer system that can be configured based on how a cable connects two devices of the computer system.

Large computer systems, including cloud computing facilities can include many compute resources spread across one or more datacenters. In aggregate, the computer systems can include many different types of components that perform different functions. When new compute resources are being readied to be deployed, the different components can be interconnected to provide compute, storage, and communication capabilities of the computing facility. For example, a server computer component can include a chassis and backplane for connecting to add-in cards. The different cards can include various respective functions, such as application specific hardware providing specialized computing capabilities, communication and network hardware and software, and other functions. The cards can be connected to each other and to networking components, such as routers, via cables.

Maintaining an inventory of different cards can be costly and can result in delays when a particular card type is not available for deployment. One solution for reducing the number of card types is to enable each card so that it is capable of performing multiple functions, and to have the particular function performed by the card configured with software or hardware. For example, a dip-switch, jumper, or resistor population can be used to determine which function (s) will be performed by the card. However, delays can still result as a technician customizes the card by soldering resistors, setting dip-switches, or connecting jumpers. In addition, errors can occur when non-conforming settings are inadvertently set, when the cards are connected improperly, or when a non-compliant combination of cards are connected (such as when resource conflicts occur). Furthermore, it can be difficult to debug and/or identify a given card in a large datacenter with an improperly set dip-switch or jumper or resistor population because the card is not visually distinctive and/or the hardware customizations of the card may be obscured by adjacent cards or an enclosure, for example.

Another solution for reducing the number of card types is to use software to customize the card types. However, configuring a card with software can cause delays to be incurred while the card is configured. For some applications, the delays may be unacceptable, such as when the capabilities of the cards are used during an initialization sequence after a power-on event. Additionally, the software used to configure the cards may make the server computer or other component used to configure the cards more complex. For example, the server computer may need to sequence the configuration of the cards with other operations of the server computer so that the cards are not improperly accessed before the cards are configured. As another example, one or more resources of the server computer may expect that the cards will pass configuration information of the cards to the resources during a power-on or initialization sequence. As a specific example, the cards may include configuration information about the cards that is passed to the server computer, and the server computer may load different software depending on which card is configured as a primary or a secondary device.

As described herein, cable-based configuration of devices can be used to potentially reduce the number of different types of devices used in a computing facility. In particular, a device can be configured based on which end of a cable is connected to the device. For example, a server can have two cards with identical hardware. For example, the cards can each have an identical application-specific integrated circuit (ASIC) that communicates to the server using the Peripheral Component Interconnect Express (PCIe) protocol. The cards can be connected together with a cable having a primary end and a secondary end. For example, the different ends can be visually distinctive, such as when the primary end is a first color (e.g., red) and the secondary end is a second color (e.g., blue). The card connected to the primary end of the cable can be configured as a primary or master card and the card connected to the secondary end of the cable can be configured as a secondary or servant card. By using the cable to determine the functionality of the card, the cards can be configured during a power-up sequence without software intervention. In other words, PCIe add-in-cards can have common hardware and common software, and the software running on the ASICs can be configured based on the orientation of the cable connecting the cards. Cable-based configuration can potentially simplify the hardware implementation and allow software running on the card to correctly initialize the hardware either as a primary or secondary device. This may reduce the complexity of the server hardware and/or software since the card can potentially be configured without server interaction. The number of card types can be reduced since one card can be either a primary or a secondary device as opposed to having separate cards perform the primary and secondary functions. The debug-time for a new deployment may be reduced since the card type can potentially be more quickly verified by looking at the visually distinctive cable as opposed to looking for a misconfigured jumper setting, dip-switch setting, or resistor population.

FIG. 1 is a system diagram showing an example computer system 100 that can be configured based on how a cable 140 connects two computing devices 110A-B of the computer system 100. Each of the computing devices 110A-B can be a server computer, a card of a server computer, or a daughter card of a circuit board, for example. A "card" can include electronic hardware and software used to supplement the functionality of a system that is connected to the card. For example, the system 100 can include a chassis and/or backplane (not shown) that is configured to accept cards in one or more "slots." The card can include a printed circuit board that is shaped so that the card fits within the chassis and electrically conducting signal traces of the board make contact with conductors of the backplane when the card is inserted into a slot of the backplane. The backplane can connect the cards and the other components of the system together so that they can communicate with each other using one or more communication protocols. The physical dimensions and/or the communication protocol of the card can be defined according to various custom or industry specifications so that cards of the same type can communicate with each other. Non-limiting examples of card types include Peripheral Component Interconnect (PCI), PCI Express (PCIe), PCI extended (PCI-X), Industry Standard Architecture (ISA), Personal Computer Memory Card International Association (PCMCIA), and custom card types.

The computing devices 110A-B can be connected to each other with a cable 140. The cable can have a first end 142 and a second end 144, where each of the ends 142, 144 are configured to connect to a respective connector 130 of the computing devices 110A-B. In particular, the first end 142 can connect to the connector 130 of computing device 110A and the second end 144 can connect to the connector 130 of computing device 110B. The connectors 130, 142, and 144 can be defined using a connector type that specifies physical dimensions of the connector, a pin-out of the connector, a gender of the connector, a compatible connector to mate with, and other various qualities of the connector. For example, the ends 142, 144 can be male connectors and the connector 130 can be a female connector. As another example, the ends 142, 144 can be female connectors and the connector 130 can be a male connector. As another example, the ends 142, 144 can be plug-type connectors and the connector 130 can be a jack-type connector. The connector 130 and the ends 142, 144 can include one or more electrically conducting terminals (e.g., pins or receptacles) that enable an electrical signal to be transmitted between a terminal of the connector 130 and a corresponding terminal of the end of the cable when they are connected. Terminals of one end (e.g., 142) are connected to terminals of the other end (e.g., 144) via conductors (e.g., wires) of the cable 140.

The cable 140 can be used to transmit one or more electrical signals between the computing devices 110A and 110B. For example, one or more configuration signals can be driven or transmitted by driving logic 120 of one device (such as device 110A) through the cable 140 to sensing logic 150 of another device (such as device 110B). As a particular example, driving logic 120 of the device 110A can drive a configuration signal to a terminal of the connector 130 of the device 110A through the corresponding terminal of the connector 142 through a conductor of the cable 140 to a terminal of the connector 144 to a terminal of the connector 130 of the device 110B to the sensing logic 150 of the device 110B. The cable 140 can be used to transmit the configuration signals and/or other signals between the devices 110A-B. Thus, the configuration signals can be the only signals transmitted by the cable 140, or the configuration signals can be a "sideband" to other signals transmitted by the cable 140. For example, in addition to providing the configuration signals, the cable 140 can include control signals and data signals for performing transactions and communicating information between the devices 110A-B. As a specific example, the cable 140 can be a PCIe cable with additional sideband configuration signals.

The first end 142 and the second end 144 can include identical connector types that are differentiated using the internal wiring of the cable 140. For example, the terminals of the ends 142, 143 can be identified with identifiers, such as D1, D2, D3, D4, and so forth. A straight-through wire can connect matching terminals of the ends 142, 143 to each other. For example, a straight-through wire can connect the terminal D1 of the end 142 to the terminal D1 of the end 144. A cross wire can connect non-matching terminals of the ends 142, 143 to each other. For example, a cross wire can connect the terminal D1 of the end 142 to the terminal D2 of the end 144. Thus, a signal can be cross-connected from one terminal of a connector to a different terminal of a connector using a cross wire. A pair of cross wires can form a cross-over pair, where terminals of the ends 142, 143 are reversed at opposite ends of the cable. For example, a cross-over pair can connect the terminal D1 of the end 142 to the terminal D2 of the end 144 and the terminal D2 of the end 142 to the terminal D1 of the end 144. Some terminals can be unconnected within the cable 140 so that there is no connection from the terminal on one end to a terminal on the other end. The cable 140 can include asymmetric wiring so that signals of one end are transmitted differently, or not at all, depending upon which end of the cable 140 the signals are transmitted from. Thus, transmitting identical signals at both ends of the cable 140 may result in different signals being received at the opposite respective ends of the cable 140.

Additionally, at least one of the first end 142 and the second end 144 can include a visual indicator so that a human can distinguish the different ends by looking at the cable. For example, one end of the cable can be red or have an identifying label to distinguish it from the other end.

The driving logic 120 can be used to generate one or more configuration signals on one device (110A or 110B) that may be received by the sensing logic 150 of the other device. As one example, the driving logic 120 can include a resistor connected to a power-supply voltage. The power-supply voltage can be associated with a logic high voltage (such as $V_{DD}$), with a logic low voltage (such as $V_{SS}$ or ground), or with some other voltage. As used herein, a resistor connected to a logic high voltage is a pull-up and a resistor connected to a logic low voltage is a pull-down. The resistance of the resistor can be varied to determine the drive strength of the pull-up or pull-down. As used herein, a strong pull-up or pull-down indicates the resistor has relatively low resistance compared to other resistors in the circuit, and a weak pull-up or pull-down indicates the resistor has relatively high resistance compared to other resistors in the circuit. For example, a strong pull-up may have a resistance between 10-100 ohms and a weak pull-up may have a resistance between 1,000-1,000,000 ohms. As another example, the driving logic 120 can include digital logic (such as a hardwired finite state machine), programmable microcode, a programmable gate array, or other suitable control circuit for providing an output voltage for at least some of the time when the computing device 110A-B is being configured. The output voltage can be provided by an output buffer at a pin of an ASIC or other integrated circuit that is electrically connected to a terminal of connector 130. For example, the driving logic 120 can include a general-purpose input-output (GPIO) pin of an ASIC that is driven with a voltage during reset.

The sensing logic 150 can be used for detecting the presence, absence, and/or value of configuration signals that are received at terminal(s) of the connector 130. The sensing logic 150 can include digital logic (such as a hardwired finite state machine), programmable microcode, a programmable gate array, or other suitable control circuits for determining when to sample the received configuration signals. The sensing logic 150 can include a level-sensitive latch and/or an edge-triggered flip-flop connected to one or more terminals of the connector 130 so that the voltage of the terminals can be sampled. The sensing logic 150 can include weak pull-ups or weak pull-downs connected to one or more terminals of the connector 130 so that the voltage of the terminals does not float when the terminals are sampled, for example. The sensing logic 150 may store the sampled values in hardware- or software-accessible registers or may communicate the sampled values directly to configuration logic 160.

Both computing devices 110A-B can drive the same configuration signals to the same terminals of connector 130, but the configuration signals received by the respective computing devices will vary depending on which end of the cable 140 is connected to which device. By evaluating the sampled configuration signals, it can be determined which end of the cable is connected to which device. For example, the sampled configuration signals can be compared to values expected to be received when the device is connected to the first end 142 or the second end 144. The device is connected to the first end 142 when the sampled values match the values expected to be received when the device is connected to the first end 142. Similarly, the device is connected to the second end 144 when the sampled values match the values expected to be received when the device is connected to the second end 144. In one embodiment, the sensing logic 150 can perform the comparison and communicate the result to the configuration logic 160. In an alternate embodiment, the configuration logic 160 can perform the comparison.

The configuration logic 160 can be used to configure the computing devices 110A-B based on which end of the cable is connected to the respective device. The configuration logic 160 can include digital logic (such as a hardwired finite state machine), programmable microcode, a programmable gate array, or other suitable control circuit for configuring the computing devices 110A-B. The configuration logic 160 can include firmware or software that, when executed by a processor, is capable of configuring the computing devices 110A-B. The configuration logic 160 can be used to customize the computing devices 110A-B based on which end of the cable is connected to the respective device so that different platforms can be provided from the same computing devices 110A-B. For example, the configuration logic 160 can be used to load different firmware from storage into memory based on which end of the cable is connected to the computing device. As another example, the configuration logic 160 can enable or disable control- or data-paths based on which end of the cable is connected to the computing device. As another example, the configuration logic 160 can modify software-visible registers based on which end of the cable is connected to the computing device. As another example, the configuration logic 160 can assign one base address to the device when the device is connected to one end of the cable and the configuration logic 160 can assign a different base address to the device when the device is connected to other end of the cable. As another example, different hardware and/or software resources can be assigned to the computing device depending on which end of the cable is connected the device. Different firmware addresses, data pools, and/or memory locations or pointers can be used based on which end of the cable is connected the device. As another example, configuration tables, such as a Desktop Management Interface (DMI) table, and other data structures can be populated differently based on which end of the cable is connected the device.

As a specific example, computing devices 110A-B can have identical hardware configurations and customized software configurations based on which end of the cable 140 is connected to the computing devices 110A-B. For example, the computing devices 110A-B can be of the same type or model. The computing device 110A can be connected to the first end 142 of the cable 140 and the computing device 110B can be connected to the second end 144 of the cable 140. Both of the computing devices 110A-B can drive the same configuration signals (via driving logic 120) to the same terminals of their respective connectors 130. The cable 140 can route the signals differently or swizzle the signals passing through the cable 140 so that the respective sensing logic 150 of each computing device receives different values for the received configuration signals. The configuration logic 160 of the respective computing devices 110A-B can configure the respective computing devices 110A-B according to which end of the cable is connected to the respective device. For example, the configuration logic 160 of computing device 110A can configure the device 110A to perform function 170 because the computing device 110A is connected to the first end 142 of the cable 140. On the other hand, the configuration logic 160 of computing device 110B can configure the device 110B to perform function 180 because the computing device 110B is connected to the second end 144 of the cable 140. Thus, the two computing devices 110A-B, which started with identical hardware configurations, can perform different functions based on which end of the cable is connected to the respective devices.

Configuring a pair of cards with a cable connecting the cards may potentially reduce errors when deploying the pairs as compared to non-cable-based configuration. For example, a technician may inadvertently install two of same type of card in a system rather than two different types of cards. However, using the cable to configure the cards can reduce or eliminate that error since different ends of the cable can be used to distinguish the individual cards of the pair. Pairs of cards may be useful when one card is a primary device and the other card is a secondary device (such as when the secondary device is used as a standby device to be used when the primary device malfunctions) or when one card is a master device and one card is a servant device, for example.

Figure 2:
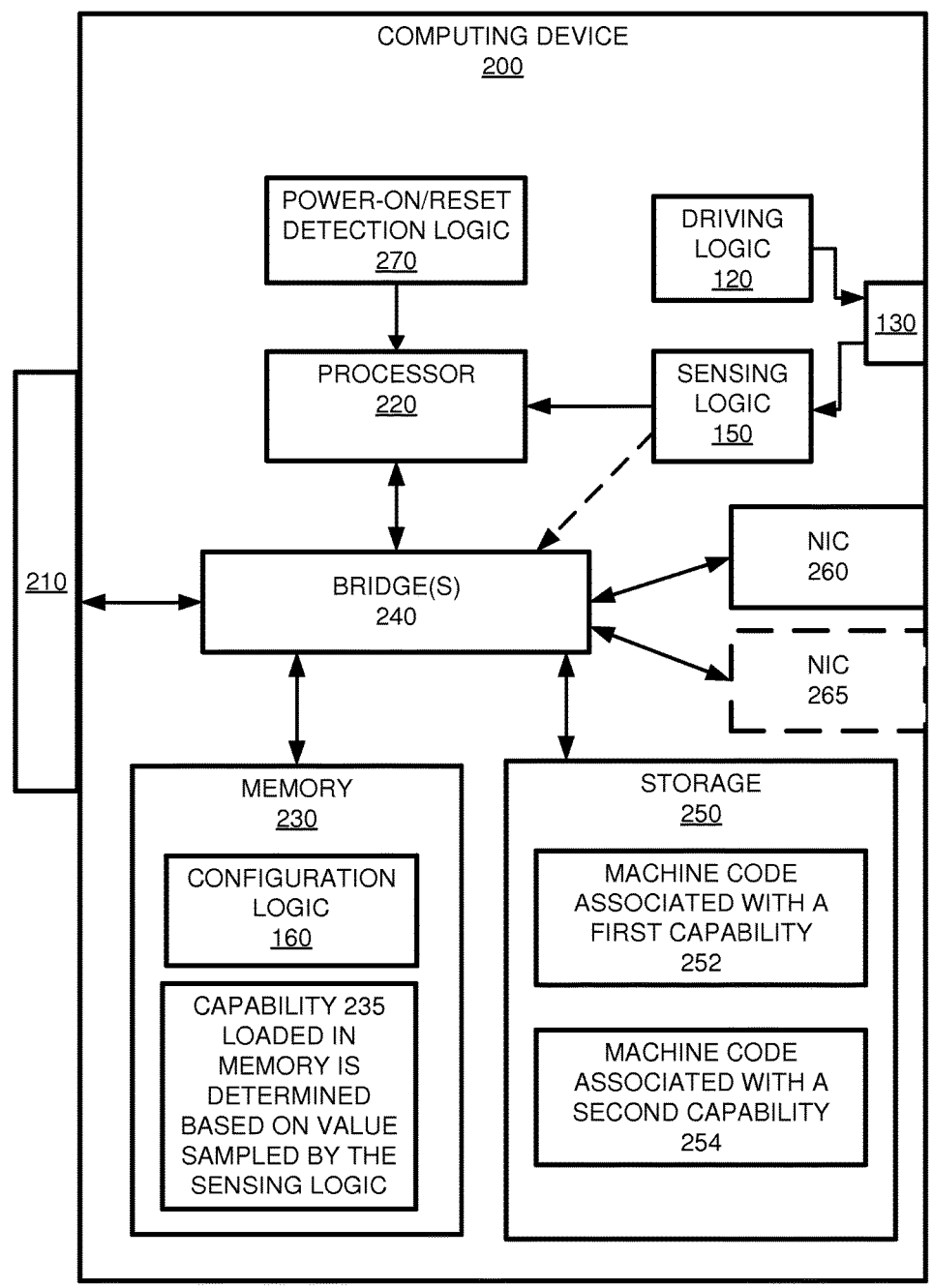
FIG. 2 is a system diagram showing an example device that can be configured based on how a cable connects to the device.

FIG. 2 is a system diagram showing an example computing device 200 that can be configured based on how a cable connects to the computing device 200. As one example, the computing device 200 can be an add-in card for a server computer. For example, the computing device 200 can connect to a backplane of the server computer via local connector 210. As a specific example, the local connector 210 can be a PCIe connector and the computing device 200 can communicate with the server computer using the PCIe protocol. The computing device 200 can include a processor 220 for executing computer-executable instructions that are fetched from memory 230. The processor 220 can be a general-purpose central processing unit (CPU), a specialized processor (such as a graphics processing unit (GPU) a physics processing unit (PPU), and so forth), an embedded processor in an ASIC or field-programmable gate array (FPGA), or any other type of processor.

The processor 220 can communicate with other devices and access memory 230 and storage 250 via one or more bridges 240. For example, the bridges 240 can include a "north bridge" for accessing memory and other high-speed ports and a "south bridge" for accessing input/output (IO) devices and slower ports. The bridges 240 may be hierarchical or cascaded so that the processor accesses the south bridge through the north bridge. The bridges 240 can include a memory controller and an IO controller. The bridges may include address tables for mapping memory and IO addresses to different devices or memories. For example, a device can be mapped to memory or IO at an assigned base address and within a particular address range. Specifically, the device can be accessed by reading or writing to addresses starting with the base address and ending with the base address plus the address range minus one. Within a given hierarchy, addresses assigned to each device should be unique or an address conflict can occur. An address conflict is when multiple devices are mapped to the same address which can cause bus contention or other erroneous behavior and can potentially damage the hardware.

The processor 220 can communicate with other devices using multiple communication protocols. For example, the processor 220 can communicate with local devices using the communication protocol supported by the local connector 210. As another example, the processor 220 can communicate with remote devices over a wired or wireless network using one or more network interface controllers (NICs), such as NIC 260 and NIC 265. For example, the NIC 260 can be used to communicate with other devices connected over a large area network (LAN) or wide area network (WAN). As a specific example, the NIC 260 may enable communication using TCP/IP packets over Ethernet. The traffic communicated over the NICs 260, 265 can be differentiated by software or physically routed over a different hardware network which can be WAN/LAN (e.g., using Ethernet TCP/IP) or storage (e.g., using serial attached SCSI (SAS) or serial ATA (SATA)), for example.

The computing device 200 can be configured based on how a cable connects to the computing device 200. As one example, the computing device 200 can be configured based on which end of the cable is connected to the connector 130. The connector 130 can include terminals for transmitting one or more configuration signals and for receiving one or more configuration signals. The driving logic 120 can be used to generate the one or more configuration signals that can be transmitted through the cable to a different computing device. The sensing logic 150 can be used to detect and/or sample the values of the one or more configuration signals received from the different computing device connected by the cable. In one example, the received configuration signals can be sampled during a power-on, boot-up, or initialization sequence. In particular, power-on and reset logic 270 can determine when a power-on event occurs, and/or when a reset signal is asserted or de-asserted. A power-on event can occur when a power-supply voltage of the computing device 200 crosses through a predetermined threshold voltage. A reset signal can be used to initialize hardware registers and logic. The reset signal can be asserted for a pre-determined amount of time after a valid power supply voltage is detected, for example. The computing device 200 can begin operation when the reset signal is de-asserted. The received configuration signals can be sampled by the sensing logic 150 in response to the power-on event or the assertion or de-assertion of reset. The sampled configuration signals can be stored in software-visible registers. For example, the registers can be mapped to memory and the processor can read the sampled values when it reads from the memory location corresponding to the address of the sampled configuration signals. Alternatively, the sensing logic 150 can communicate with the processor 220 and/or with the bridge(s) 240.

The computing device 200 can be configured during an initialization sequence following a reset or a power-on event. As one example, basic input output system (BIOS) firmware can be used to initialize the processor 220 and other hardware during the booting process (power-on startup) and to act as an intermediary software layer between the hardware and higher levels of software. In particular, the BIOS can include a boot loader (not shown) to load an operating system from the mass storage device 250. The BIOS can include the configuration logic 160 or the BIOS can load the configuration logic 160 into memory 230 so that the configuration logic 160 can be executed by the processor 220 during the initialization sequence. The configuration logic 160 can load additional capabilities into the memory 230, such as capability 235 which is determined based on the value(s) sampled by the sensing logic 150. For example, the configuration logic 160 can determine the sampled configuration signals by reading the corresponding register(s) used to store the sampled configuration signals. The sampled configuration signals can be compared to expected or legal settings of the configuration signals, and the capability 235 can be loaded based on the result of the comparison. For example, the capability 235 can be selected from one or more binary packages stored in mass storage device 250, such as machine code associated with a first capability 252 and machine code associated with a second capability 254. As a specific example, the machine code associated with the first capability 252 can be loaded into the memory 230 when the first end of the cable is attached to the computing device 200 and the machine code associated with the second capability 254 can be loaded into the memory 230 when the second end of the cable is attached to the computing device 200.

Figure 3:
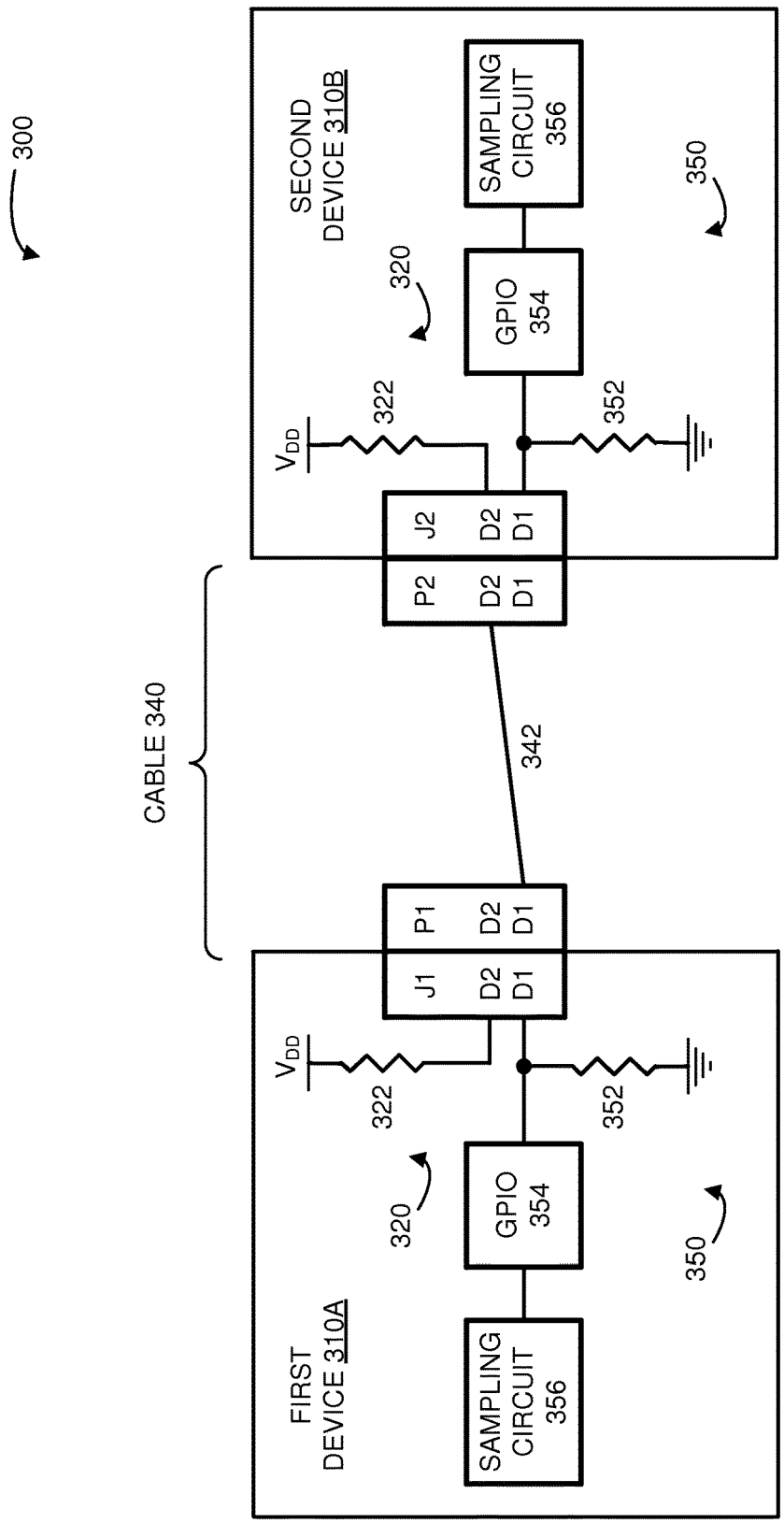
FIGS. 3-5 are system diagrams showing example cables and driving and sensing logic for determining which end of a cable is connected to each device.
Figure 4:
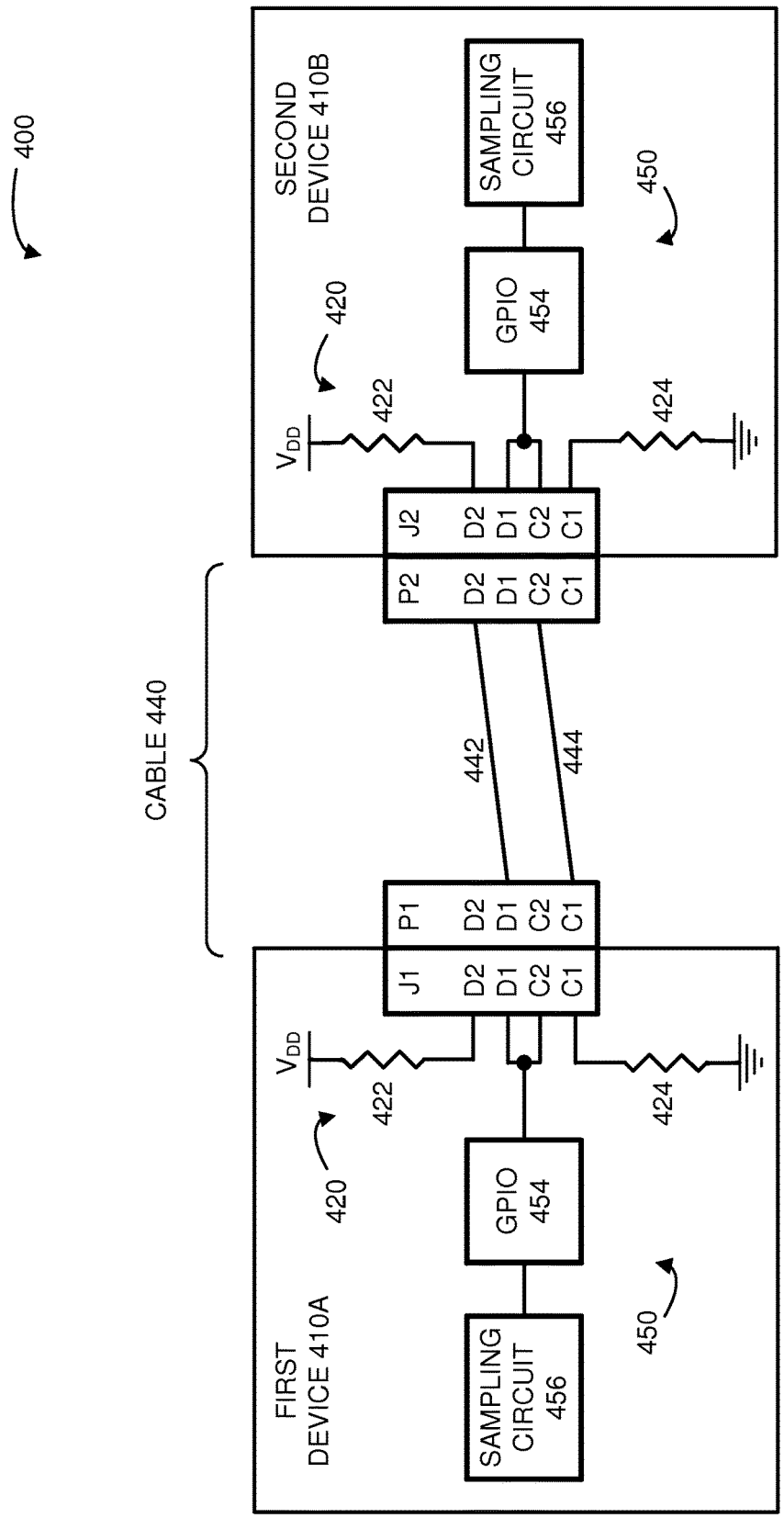
Figure 5:
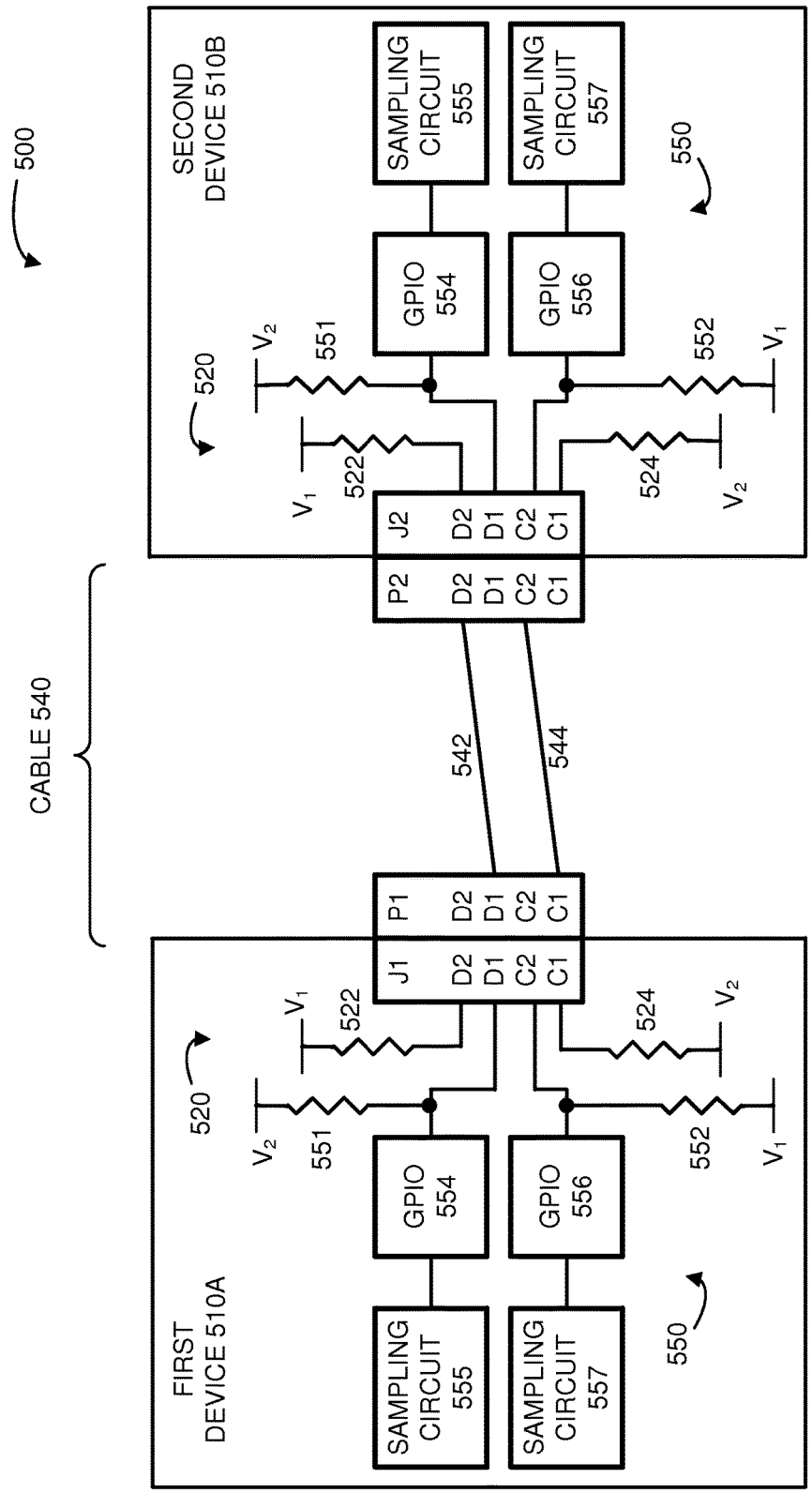

FIGS. 3-5 are system diagrams showing example cables and driving and sensing logic for determining which end of a cable is connected to each device. While the following examples illustrate specific implementations of driving logic and sensing logic for determining which end of a cable is connected to each device, various alternatives are possible.

In FIG. 3, system 300 includes a first device 310A connected to a second device 310B by cable 340. In this example, the first and second devices 310A-B have identical hardware configurations including driving logic 320 and sensing logic 350. The driving logic 320 includes a pull-up resistor 322 connected to a power supply voltage $V_{DD}$. For example, the pull-up resistor 322 can be a strong pull-up. The pull-up resistor 322 is connected to a terminal of a connector of the devices, such as terminal D2 of connector J2 and terminal D2 of connector J1. The connectors J1 and J2 can be identical connector types configured to connect to either end of the cable 340.

The sensing logic 350 can include a pull-down resistor 352 having one terminal connected to ground and one terminal connected to the connector J1 or J2 and a GPIO pin 354 of a processor or ASIC. The pull-down resistor 352 can be a weak pull-down. The GPIO pin 354 can be configured to be an input pin during at least reset. The GPIO pin 354 can be connected to a sampling circuit 356 which can be configured to detect the value of the input voltage and store the value or the logical value of the input voltage in a register. For example, the sampling circuit 356 can be configured to sample the input voltage when reset is de-asserted and store the logical value (e.g., 0 or 1) of the input voltage in a register.

The cable 340 can include connectors P1 and P2 and a wire 342. The wire 342 can be a cross-wire connecting a terminal D2 of the connector P2 to a terminal D1 of the connector P1. The terminals D1 of the connector P2 and D2 of the connector P1 can be unconnected within the cable 340. When the cable 340 is connected to the devices 310A-B as illustrated, the sensing logic 350 of the respective devices can be used to determine which end of the cable 340 is connected to which device. In particular, the strong pull-up 322 connected to terminal D2 of connector J2 can be used to transmit a logic-high signal to the sampling circuit 356 of the first device 310A. However, there is no connection from the strong pull-up 322 connected to terminal D2 of connector J1 to the second device 310B. Thus, the sampling circuit 356 of the second device 310B will sample a logic-low signal that is provided by the weak pull-down 352. Summarizing, the first device 310A will sample a logic-high signal indicating it is connected to the P1 end of the cable 340 and the second device 310B will sample a logic-low signal indicating it is connected to the P2 end of the cable 340. If the cable is reversed, so that the P2 end is connected to J1 and the P1 end is connected to J2, the values of the configuration signals sampled by each device will also be reversed. Thus, the devices can determine which end of the cable is connected to the respective device, and the devices can be configured accordingly.

In an alternative embodiment, the sense of the power-supply voltages of the driving logic 320 and the sensing logic 350 can be reversed. In other words, the driving logic 320 can include a strong pull-down and the sensing logic can include a weak pull-up. Thus, the device connected to the P1 end of the cable 340 will sample a logic-low and the device connected to the P2 end of the cable 340 will sample a logic-high.

FIG. 4 illustrates another example of logic for determining which end of a cable is connected to each device. In particular, FIG. 4 illustrates a system 400 including a first device 410A connected to a second device 410B by cable 440. The driving logic 420 includes a pull-up resistor 422 connected to a power supply voltage $V_{DD}$ and a pull-down resistor 424 connected to ground. For example, the pull-up resistor 422 can be a strong pull-up and the pull-down resistor 424 can be a strong pull-down. The pull-up resistor 422 is connected to terminal D2 of a connectors J2, J1 and the pull-down resistor 424 is connected to terminal C2 of a connectors J2, J1. The sensing logic 450 can include a GPIO pin 454 connected to a sampling circuit 456. In this embodiment, the sensing logic 450 does not have a pull-down or a pull-up. The GPIO pin 454 can be connected to terminals D1 and C1 of the connectors J2, J1.

The cable 440 can include connectors P1 and P2 and a wires 442 and 444. The wire 442 can be a cross wire connecting a terminal D2 of the connector P2 to a terminal D1 of the connector P1. The wire 444 can be a cross wire connecting a terminal C2 of the connector P2 to a terminal C1 of the connector P1. The terminals D1 and C1 of the connector P2 and D2 and C2 of the connector P1 can be unconnected within the cable 440. When the cable 440 is connected to the devices 410A-B as illustrated, the sensing logic 450 of the respective devices can be used to determine which end of the cable 440 is connected to which device. In particular, the pull-up 422 connected to terminal D2 of connector J2 can be used to transmit a logic-high signal to the sampling circuit 456 of the first device 410A. The pull-down 424 connected to terminal C1 of connector J1 can be used to transmit a logic-low signal to the sampling circuit 456 of the second device 410B. The first device 410A will sample a logic-high signal indicating it is connected to the P1 end of the cable 440 and the second device 410B will sample a logic-low signal indicating it is connected to the P2 end of the cable 440. If the cable is reversed, so that the P2 end is connected to J1 and the P1 end is connected to J2, the values of the configuration signals sampled by each device will also be reversed. Thus, the devices can determine which end of the cable is connected to the respective device, and the devices can be configured accordingly.

In an alternative embodiment, the sense of the power-supply voltages of the driving logic 420 can be reversed. In other words, the driving logic 420 can include a pull-down connected to D2 and a pull-up connected to C2. Thus, the device connected to the P1 end of the cable 440 will sample a logic-low and the device connected to the P2 end of the cable 440 will sample a logic-high.

FIG. 5 illustrates another example of logic for determining which end of a cable is connected to each device. In particular, FIG. 5 illustrates a system 500 including a first device 510A connected to a second device 510B by cable 540. The driving logic 520 includes a resistor 522 connected to a power supply voltage $V_1$ and a resistor 524 connected to a power supply voltage $V_2$. For example, the respective resistors 522 and 524 can be a strong pull-up or a strong pull-down. The resistor 522 is connected to terminal D2 of a connectors J2, J1 and the resistor 524 is connected to terminal C2 of a connectors J2, J1. The sensing logic 550 can include a first GPIO pin 554 connected to a first sampling circuit 555 and a second GPIO pin 556 connected to a second sampling circuit 557. The sensing logic 550 can include a resistor 551 connected between a power supply voltage $V_2$ and the D1 terminal of the connectors J2, J1. The sensing logic 550 can include a resistor 552 connected between a power supply voltage $V_1$ and the C1 terminal of the connectors J2, J1. For example, the respective resistors 551 and 552 can be a weak pull-up or a weak pull-down. The GPIO pin 554 can be connected to the terminal D1 of the connectors J2, J1, and the GPIO pin 556 can be connected to the terminal C1 of the connectors J2, J1.

The cable 540 can include connectors P1 and P2 and a wires 542 and 544. The wire 542 can be a cross wire connecting a terminal D2 of the connector P2 to a terminal D1 of the connector P1. The wire 544 can be a cross wire connecting a terminal C2 of the connector P2 to a terminal C1 of the connector P1. The terminals D1 and C1 of the connector P2 and D2 and C2 of the connector P1 can be unconnected within the cable 540. When the cable 540 is connected to the devices 510A-B as illustrated, the sensing logic 550 of the respective devices can be used to determine which end of the cable 540 is connected to which device.

The sensing logic 550 of the respective devices can also be used to determine whether the cable 540 is connected to both of the devices.

In particular, the voltage $V_1$ can be indicative of a logic high and the voltage $V_2$ can be indicative of a logic low. Thus, when the cable 540 is connected as illustrated, the first device 510A will detect a logic high at terminal D1 and a logic high at terminal C1 indicating it is connected to end P1; and the second device 510B will detect a logic low at terminal D1 and a logic low at terminal C1 indicating it is connected to end P2. When the cable 540 is not connected, both devices 510A-B will detect a logic low at terminal D1 and a logic high at terminal C1. In an alternative embodiment, the sense of the power-supply voltages can be reversed so that voltage $V_1$ is indicative of a logic low and the voltage $V_2$ is indicative of a logic high.

Figure 6:
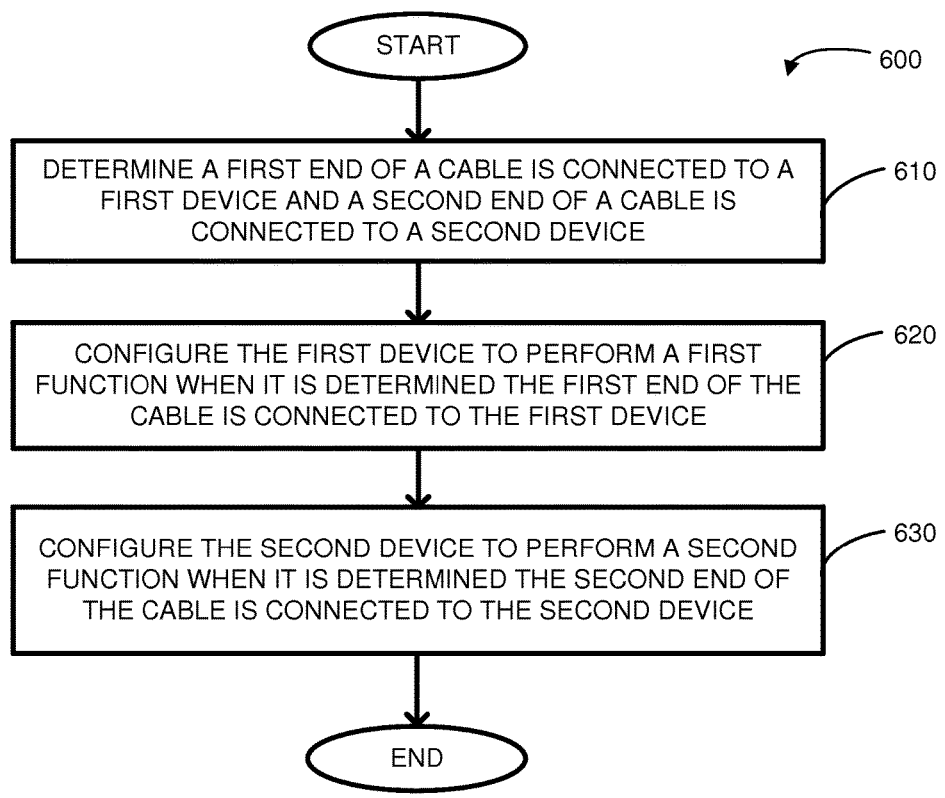
FIGS. 6-7 are flow diagrams showing example methods of configuring devices based on how a cable connects the devices.
Figure 7:
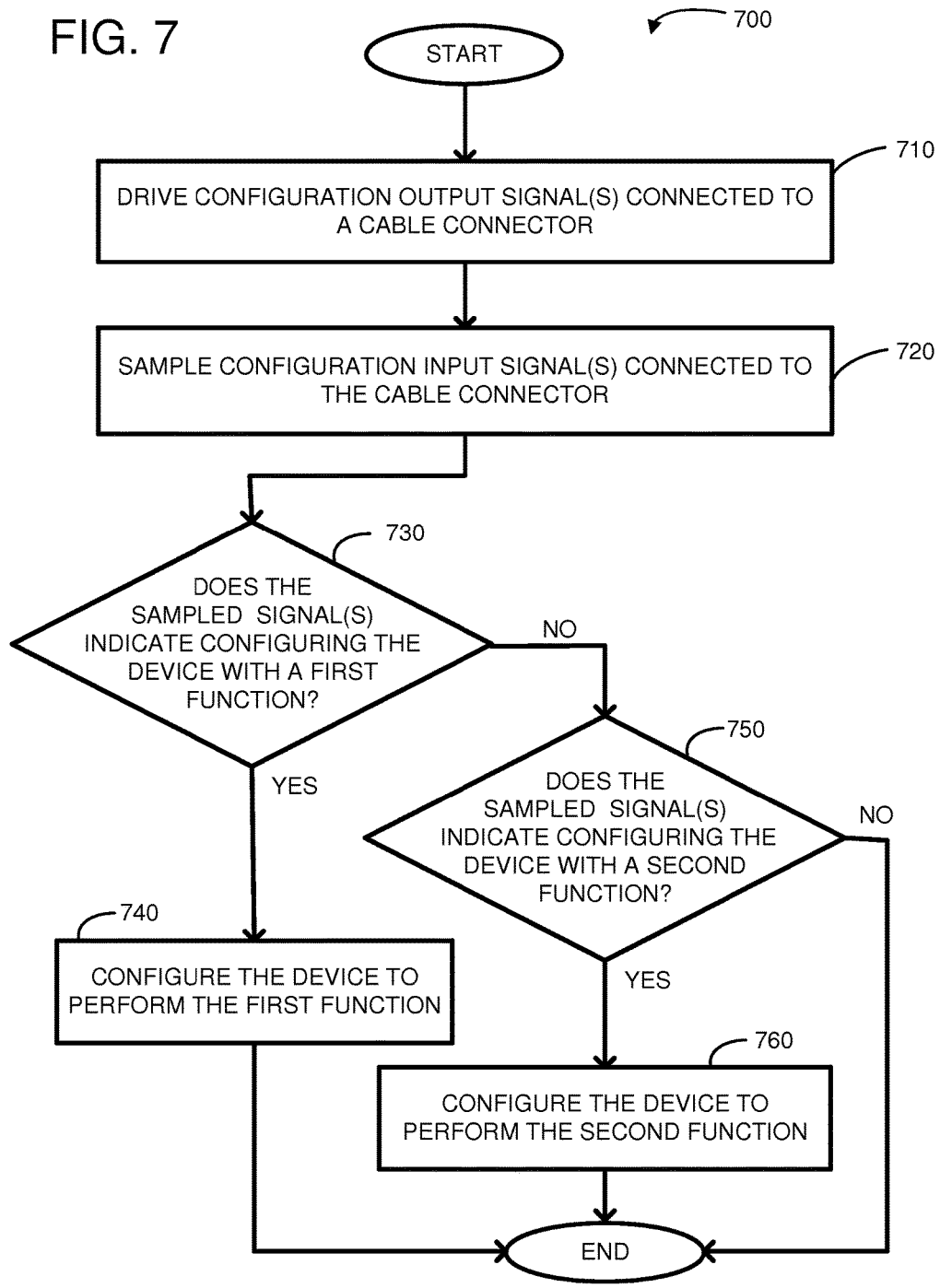

FIGS. 6-7 are flow diagrams showing example methods of configuring devices based on how a cable is connected to the devices. FIG. 6 is a flow diagram showing an example method 600 of configuring two devices that are connected together by a cable. FIG. 7 is a flow diagram showing an example method 700 of configuring a device that is connected to a cable.

Turning to FIG. 6, method 600 includes, at 610, determining a first end of a cable is connected to a first device and a second end of the cable is connected to a second device. Determining the first end of the cable is connected to the first device and the second end of a cable is connected to the second device can occur during a power-on sequence, such as by a sequence that is initiated at the de-assertion of a reset signal, for example. Determining the first end of the cable is connected to the first device can include driving one or more configuration signals from the second device, transmitting the one or more configuration signals through the cable, and sampling the received one or more configuration signals from the cable at the first device. Similarly, determining the second end of the cable is connected to the second device can include driving one or more configuration signals from the first device, transmitting the one or more configuration signals through the cable, and sampling the received one or more configuration signals from the cable at the second device. The respective configuration signals can be driven by a resistor connected to a power supply voltage or by an output pin of digital logic, a processor, or an ASIC. As a specific example, the respective configuration signals can be driven by a strong pull-up or a strong pull-down. Determining the first end of the cable is connected to the first device can include determining that one or more configuration signals generated at the second device are not transmitted through the cable to the first device. Similarly, determining the second end of the cable is connected to the second device can include determining that one or more configuration signals generated at the first device are not transmitted through the cable to the second device.

The hardware configuration of the first device and the second device can be identical, including a type of connector for connecting to the cable. The cable ends can include connectors of the same connector type. Thus, either cable end can connect to either device. The cable ends can include a visual identifier that labels or distinguishes the cable ends. The cable can transmit the configuration signals and other signals between the two devices. One or more of the configuration signals can be swizzled or crossed as the one or more configuration signals are transmitted through the cable. One or more of the configuration signals can be unconnected in the cable. One or more of the configuration signals can be passed straight-through the cable.

At 620, the first device can be configured to perform a first function when it is determined the first end of the cable is connected to the first device. At 630, the second device can be configured to perform a second function when it is determined the second end of the cable is connected to the second device. The second function can be different from the first function, such that the first device and the second device are configured differently based on which end of the cable is connected to the respective devices. Thus, a respective device can be configured to perform a particular function based on which end of the cable is connected the respective device. Configuring a respective device to perform the particular function can include loading firmware associated with the end of the cable connected to the respective device. For example, initialization code or logic, such as BIOS firmware, can load different binary packages from storage and into memory for execution by a processor depending on which end of the cable is connected to the respective device. The binary package can include computer-executable machine code capable of performing the particular function. For example, the particular function can be a primary or master communication interface for communicating with other devices and/or services connected to or accessible over a LAN. As another example, the particular function can be a secondary or servant communication interface for communicating with other devices and/or services connected to or accessible over the LAN. As another example, the particular function can be a communication interface for communicating with a storage area network (SAN) or a storage service of a computing facility. As another example, the particular function can be initialization code for setting up one or more address tables, such as address tables in one or more bridges of the respective device. Thus, the first device can be configured to be accessed within a first range of addresses, and the second device can be configured to be accessed within a second range of addresses that is different from and does not conflict with the first range of addresses. In one embodiment, the device configuration can occur as part of an initialization sequence, without interaction from a server computer, so that the particular function is ready for use when the initialization sequence concludes.

FIG. 7 is a flow diagram showing an example method 700 of configuring a device based on how a cable is connected to the device. At 710, configuration signal(s) can be driven onto output terminal(s) of a cable connector. For example, the respective configuration signal(s) can be driven using a strong pull-up or pull-down. At 720, configuration signal(s) can be sampled from input terminal(s) of the cable connector. For example, the respective configuration signal(s) can be sampled by a latch or a flip-flop at the de-assertion of reset. The logic values of the sampled configuration signal(s) can be stored in registers. At 730, it can be determined whether the sampled configuration signal(s) indicate configuring the device with a first function. For example, the sampled configuration signal(s) can correspond to being connected to a first end of a cable that is associated with the first function. If the sampled configuration signal(s) indicate configuring the device with the first function, at 740, the device can be configured to perform the first function. At 750, it can be determined whether the sampled configuration signal(s) indicate configuring the device with a second function. For example, the sampled configuration signal(s) can correspond to being connected to a second end of the cable that is associated with the second function. If the sampled configuration signal(s) indicate configuring the device with the second function, at 760, the device can be configured to perform the second function.

Figure 8:
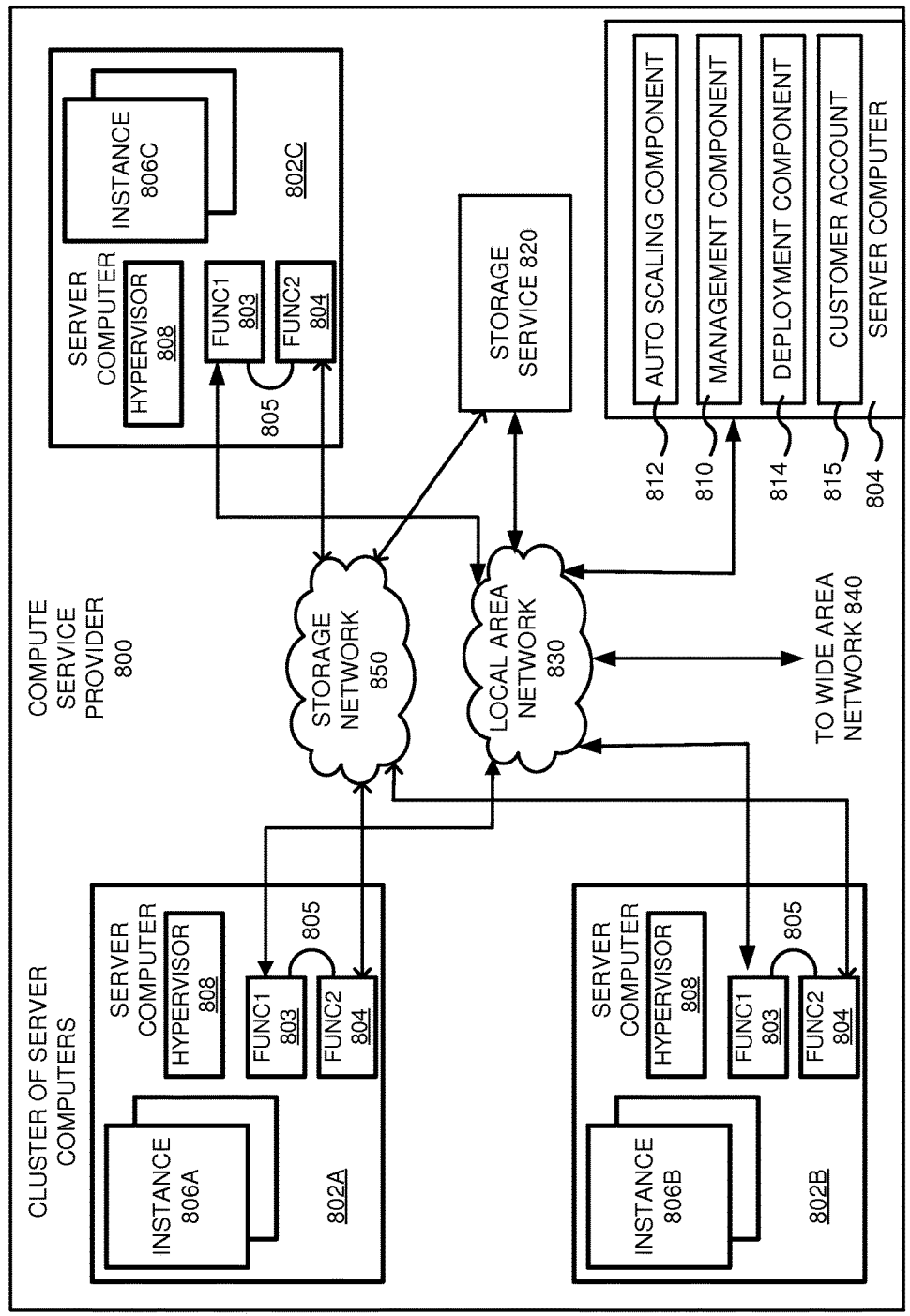
FIG. 8 is an example system diagram showing a plurality of virtual machine instances running in a multi-tenant environment, where some devices of the multi-tenant environment are configured based on how a cable connects those devices.

FIG. 8 is an example system diagram showing a plurality of virtual machine instances running in a multi-tenant environment, where some devices of the multi-tenant environment are configured based on how a cable connects those devices. In particular, FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients.

In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802C. While only three server computers are shown, any number can be used, and large centers can include thousands of server computers. The server computers 802A-802C can provide computing resources for executing software instances 806A-806C. In one embodiment, the instances 806A-806C are virtual machines. As known in the art, a virtual machine is an instance of a software implementation of a machine (i.e. a computer) that executes applications like a physical machine. In the example of virtual machine, each of the servers 802A-802C can be configured to execute a hypervisor 808 or another type of program configured to enable the execution of multiple instances 806 on a single server. Additionally, each of the instances 806 can be configured to execute one or more applications.

In an example embodiment, each of the server computers 802A-802C may also comprise a first device (FUNC1) 803 and a second device (FUNC2) 804 that are configured based on which end of a cable 805 is connected to which respective device, as explained in greater detail in reference to FIGS. 1-7. The cable 805 can be an internal cable routed within an enclosure of the respective server computer. Alternatively, the cable 805 can be an external cable routed outside of the enclosure of the respective server computer. The first device 803 can be configured to perform a first function and the second device 804 can be configured to perform a second function different from the first function, such that the first device 803 and the second device 804 are configured differently based on which end of the cable 805 is connected to the respective devices. As a specific example, the first device 803 can be a PCIe card configured as a network engine for routing network traffic between the local server and remote servers reachable over the LAN 830 and the WAN 840. The second device 804 can be a PCIe card configured as a storage engine for routing storage traffic between the local server and remote storage (e.g., storage service 820) reachable over the storage network 850.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802C and the server computer 804. The network 830 can be a local area network (LAN) and can be connected to a Wide Area Network (WAN) 840 so that end users can access the compute service provider 800. It should be appreciated that the network topology illustrated in FIG. 8 has been simplified and that many more networks and networking devices can be utilized to interconnect the various computing systems disclosed herein.

Figure 9:
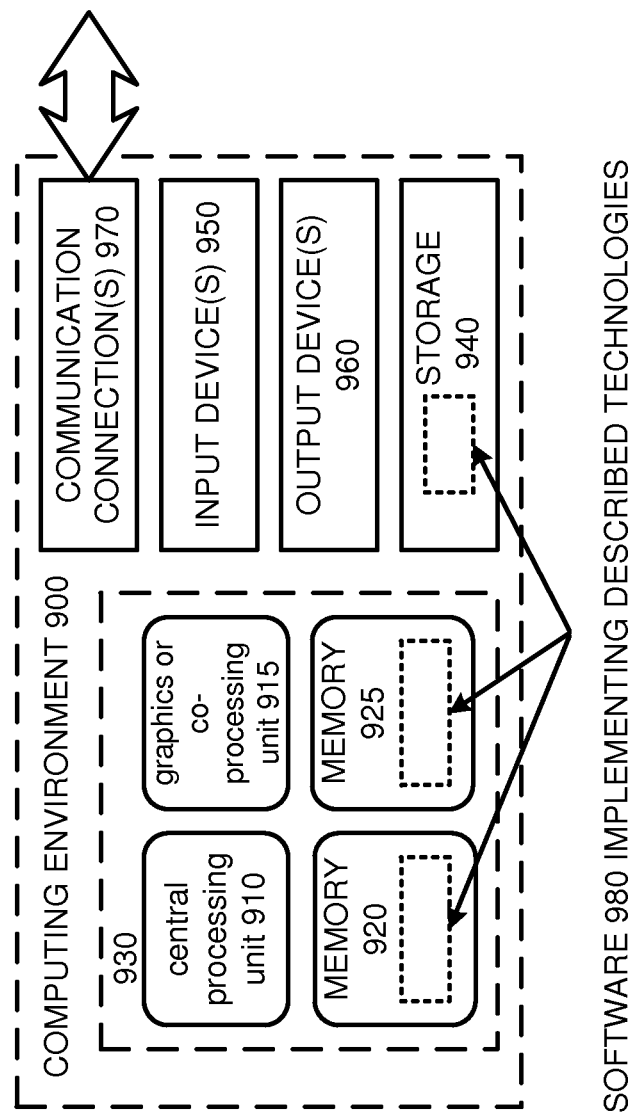
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system comprising:
a cable having a primary end and a secondary end;
a first device connected to the cable and adapted to:
    determine which end of the cable is connected to the first device; and
    in response to determining the primary end of the cable is connected to the first device, load first executable code into a memory of the first device to configure the first device to perform a first function based on which end of the cable is connected to the first device; and
a second device connected to the cable and adapted to:
    determine which end of the cable is connected to the second device; and
    in response to determining the secondary end of the cable is connected to the second device, load second executable code into a memory of the second device to configure the second device to perform a second function based on which end of the cable is connected to the second device, the second function different from the first function.

2. The system of claim 1, wherein the cable is adapted to transmit a configuration signal from the first device to the second device when the cable is connected to the first device and the second device, and wherein determining which end of the cable is connected to the second device comprises sampling the configuration signal at the second device.

3. The system of claim 1, further comprising power-on reset logic adapted to assert a reset signal, and wherein it is determined which end of the cable is connected to the first device when the reset signal is asserted.

4. The system of claim 1, wherein the first device and the second device are server computer cards connected to a server computer chassis, and configuring the first device to perform the first function comprises configuring platform software of the first device, and configuring the second device to perform the second function comprises configuring platform software of the second device.

5. The system of claim 4, wherein configuring platform software comprises assigning a base address to the respective device.

6. The system of claim 1, wherein the first device and the second device each comprise respective storage having computer-executable machine code capable of performing the first function and the second function, and wherein loading the first executable code into the memory of the first device comprises loading the machine code capable of performing the first function from storage and into the memory of the first device.

7. The system of claim 1, wherein the first device and the second device have a same hardware configuration.

8. The system of claim 1, wherein the primary end and the secondary end of the cable have a same connector type, and at least one of the primary end and the secondary end of the cable are marked with a visual indicator for distinguishing between the different ends.

9. A method comprising:
determining a first end of a cable is connected to a first device and a second end of the cable is connected to a second device;
in response to determining the first end of the cable is connected to the first device, loading a first software package, associated with the first end of the cable, into a memory of the first device to configure the first device to perform a first function; and
in response to determining the second end of the cable is connected to the second device, loading a second software package, associated with the second end of the cable, into a memory of the second device to configure the second device to perform a second function, the second function different from the first function, such that the first device and the second device are configured differently based on which end of the cable is connected to the respective devices.

10. The method of claim 9, wherein determining the first end of the cable is connected to the first device and the second end of a cable is connected to the second device occurs during a power-on sequence.

11. The method of claim 9, wherein determining the first end of the cable is connected to the first device and the second end of a cable is connected to the second device comprises driving a first transmitted configuration signal from the first device to the cable and driving a second transmitted configuration signal from the second device to the cable.

12. The method of claim 9, wherein determining the first end of the cable is connected to the first device and the second end of the cable is connected to the second device comprises sampling a first received configuration signal from the cable at the first device and sampling a second received configuration signal from the cable at the second device.

13. The method of claim 9, further comprising cross-connecting one or more configuration signals transmitted through the cable.

14. The method of claim 9, wherein the first end of the cable and the second end of the cable have a same connector type.

15. The method of claim 9, wherein configuring the first device to perform the first function comprises assigning a base address to the first device.

16. The method of claim 9, wherein the first device and the second device are cards of a server computer within a multi-tenant environment.

17. The method of claim 9, wherein the first device and the second device are a same type of device.

18. An apparatus comprising:
   a processor;
   memory in communication with the processor;
   a non-volatile storage device having a plurality of packages of computer-executable instructions stored therein for performing different respective functions;
   a cable connector comprising an output terminal for driving a transmitted configuration signal to a cable and an input terminal for receiving a received configuration signal from the cable;
   sampling logic for detecting a value of the received configuration signal, the value of the received configuration signal indicative of which end of the cable is connected to the cable connector; and
   configuration logic adapted to receive the value of the received configuration signal and determine which end of the cable is connected to the cable connector, and in response to the determination, load a first package from the non-volatile storage device into the memory when it is determined a first end of the cable is attached to the cable connector and load a second different package from the non-volatile storage device into the memory when it is determined a second end of the cable is attached to the cable connector, so that the apparatus is configured based on which end of the cable is connected to the cable connector.

19. The apparatus of claim 18, further comprising power-on reset detection logic, and wherein the sampling logic is further adapted to detect the value of the received configuration signal when the apparatus is powered on or reset.

20. The apparatus of claim 18, wherein the output terminal for driving the transmitted configuration signal is driven by a resistor connected to a supply voltage.

* * * * *